United States Patent
Inada et al.

(10) Patent No.: US 9,382,852 B2
(45) Date of Patent: Jul. 5, 2016

(54) CONTROL DEVICE FOR INTERNAL COMBUSTION ENGINE HAVING CYLINDER RESTING MECHANISM

(71) Applicant: MITSUBISHI ELECTRIC CORPORATION, Chiyoda-ku, Tokyo (JP)

(72) Inventors: Takahiko Inada, Tokyo (JP); Takahiro Enomoto, Tokyo (JP); Yuhei Matsushima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 181 days.

(21) Appl. No.: 14/333,654

(22) Filed: Jul. 17, 2014

(65) Prior Publication Data

US 2015/0300271 A1    Oct. 22, 2015

(30) Foreign Application Priority Data

Apr. 21, 2014  (JP) ................................. 2014-087061

(51) Int. Cl.

| | |
|---|---|
| F02D 17/00 | (2006.01) |
| F02D 13/06 | (2006.01) |
| F02D 17/02 | (2006.01) |
| F02D 41/00 | (2006.01) |
| F02D 41/22 | (2006.01) |
| F02P 17/12 | (2006.01) |

(52) U.S. Cl.
CPC ................ *F02D 13/06* (2013.01); *F02D 17/02* (2013.01); *F02D 41/0087* (2013.01); *F02D 41/221* (2013.01); *F02P 17/12* (2013.01); *F02D 2041/0012* (2013.01); *Y02T 10/18* (2013.01); *Y02T 10/40* (2013.01)

(58) Field of Classification Search
CPC ....... F02D 41/0087; F02D 17/00; F02D 17/02
USPC ........ 123/90.15–90.18, 198 F, 481; 73/114.79
See application file for complete search history.

(56) References Cited

U.S. PATENT DOCUMENTS

| | | | | |
|---|---|---|---|---|
| 6,776,134 | B2 * | 8/2004 | Wildner | .................. F02B 77/08 123/198 F |
| 7,546,827 | B1 * | 6/2009 | Wade | ..................... F01L 1/181 123/198 F |

(Continued)

FOREIGN PATENT DOCUMENTS

| | | |
|---|---|---|
| JP | 2009-270492 A | 11/2009 |
| JP | 2012-92745 A | 5/2012 |

*Primary Examiner* — Erick Solis
(74) *Attorney, Agent, or Firm* — Sughrue Mion, PLLC

(57) ABSTRACT

Provided is a control device for an internal combustion engine having a cylinder resting mechanism, capable of accurately detecting an intake/exhaust valve state and therefore serving to solve problems of fuel depletion and environmental conservation. The control device includes: ignition means 2 including high voltage means 202 for causing ignition discharge on an ignition plug based on an ignition signal, and an ignition discharge parameter detection circuit 203 for detecting a parameter indicating a state of the ignition discharge; and valve state determination means 206 for determining a valve operation state of an intake/exhaust valve based on at least one of an ignition discharge duration, ignition insulation breakdown voltage, and ignition discharge maintaining voltage detected based on an output signal from the ignition discharge parameter detection circuit 203. Operation of cylinder resting control means 207 is controlled based on a determination result by the valve state determination means 206.

6 Claims, 8 Drawing Sheets

(56) References Cited

U.S. PATENT DOCUMENTS

2002/0189576 A1* 12/2002 Wildner ............ F02B 77/08
123/198 F

2010/0031738 A1* 2/2010 Feldkamp ........... G01M 15/042
73/114.79

* cited by examiner

CONTROL DEVICE FOR INTERNAL COMBUSTION ENGINE HAVING CYLINDER RESTING MECHANISM

BACKGROUND OF THE INVENTION

1. Field of the Invention

The present invention relates to a control device for an internal combustion engine having a cylinder resting mechanism, and particularly, to a device for determining an intake/exhaust valve operation state.

2. Description of the Background Art

In recent years, problems of environmental conservation and fuel depletion have been raised, and it is a great challenge to address these problems also for automobile industry. In addressing these problems, an internal combustion engine is developed which has a cylinder resting mechanism configured to rest fuel injection and valve driving in some of a plurality of cylinders and perform operation with the other cylinders.

Conventionally, as a device for determining a valve operation state of an internal combustion engine having a cylinder resting mechanism, a device for determining a valve operation state, depending on whether or not intake pulsation due to an intake process of each cylinder occurs, based on output of an air flow meter, is proposed (for example, see Japanese Laid-Open Patent Publication No. 2009-270492, hereinafter, Patent Document 1), and a device for determining a valve operation state based on an exhaust air fuel ratio is proposed (for example, see Japanese Laid-Open Patent Publication No. 2012-92745, hereinafter, Patent Document 2).

In an internal combustion engine having a cylinder resting mechanism, while the operation state of one valve is normal, the operation state of the other valve may be abnormal. In the conventional device shown in Patent Document 1, since the valve operation state is determined based on output of an air flow meter provided on the intake side, the operation state of an exhaust valve cannot be determined when an intake valve is closed. On the other hand, in the conventional device shown in Patent Document 2, since the valve operation state is determined based on output of an exhaust air fuel ratio sensor provided on the exhaust side, the operation state of an intake valve cannot be determined when an exhaust valve is closed.

SUMMARY OF THE INVENTION

The present invention has been made to solve such problems in conventional devices as described above, and an object of the present invention is to provide a control device for an internal combustion engine having a cylinder resting mechanism, capable of accurately determining an intake/exhaust valve operation state and therefore serving to solve problems of fuel depletion and environmental conservation.

A control device for an internal combustion engine according to the present invention includes: cylinder resting control means for giving an instruction to stop valve driving of opening or closing an intake/exhaust valve of an internal combustion engine and stop fuel injection to a cylinder of the internal combustion engine; ignition control means for generating an ignition signal both in a valve-driven case and in a valve-rested case of the internal combustion engine; ignition means including high voltage means for causing ignition discharge on an ignition plug provided in a combustion chamber of the internal combustion engine, based on the ignition signal, and an ignition discharge parameter detection circuit for detecting a parameter indicating a state of the ignition discharge; and valve state determination means for determining an operation state of the intake/exhaust valve, based on at least one of an ignition discharge duration, ignition insulation breakdown voltage, and ignition discharge maintaining voltage which are detected based on an output signal from the ignition discharge parameter detection circuit, wherein the cylinder resting control means is operated based on a result of determination by the valve state determination means.

The present invention makes it possible to accurately determine an intake/exhaust valve operation state of an internal combustion engine having a cylinder resting mechanism, thereby enabling efficient control of an internal combustion engine having a cylinder resting mechanism.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 8:
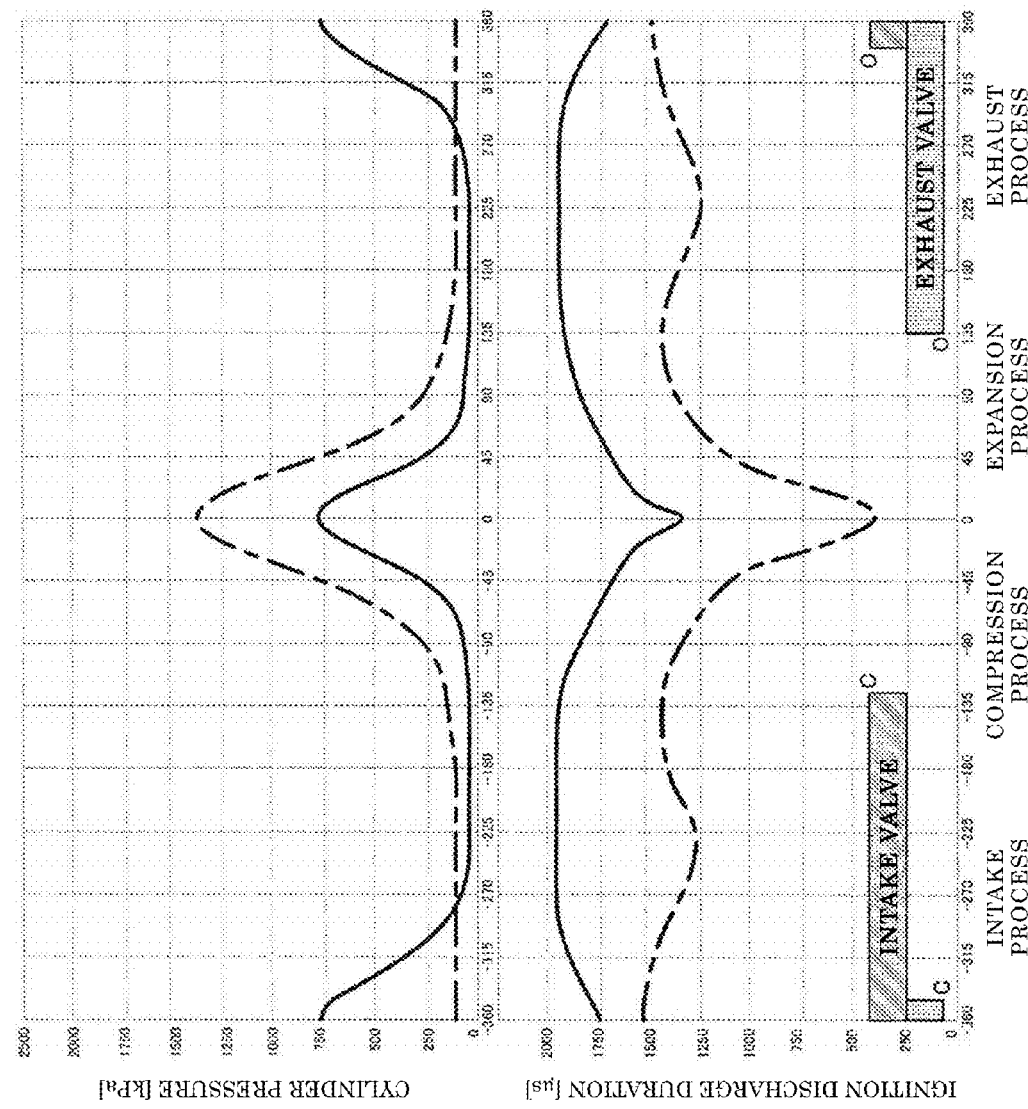
FIG. 8 is graphs for explaining the relationship of a cylinder-inside pressure relative to each crank angle and the relationship of an ignition discharge duration relative to ignition at each crank angle, in a valve-driven case and a valve-rested case, which were obtained by experiments.

First, the inventors of the present application considered means for solving the above problems. Focusing on the fact that, in an internal combustion engine having a cylinder resting mechanism, there is a difference in pressure or flow in a combustion chamber between a valve-driven case and a valve-rested case, they obtained, through experiments, a result that the difference is relevant to a duration of ignition discharge by an ignition plug provided in the combustion chamber (see FIG. 8). In FIG. 8, dotted-dashed lines indicate a valve-driven case, and solid lines indicate a valve-rested case.

First, looking at an intake/exhaust process, in a valve-driven case, flow occurs due to intake or exhaust when a valve is opened. As a result, ignition discharge between ignition plug electrodes is drifted. An ignition discharge path is elongated by an amount corresponding to the drift, so that discharge maintaining voltage increases.

On the other hand, in a valve-rested case, a valve is always closed, and there is almost no influence of flow due to intake or exhaust performed when a valve is opened. Therefore, ignition discharge is hardly drifted and an ignition discharge path is not elongated. Therefore, discharge maintaining voltage is smaller than in a valve-driven case.

Basically, since the same energy is given to an ignition plug, if discharge maintaining voltage increases, energy consumption also increases. Therefore, a discharge duration until the given energy is lost shortens.

In addition, there is a difference in pressure in a combustion chamber between a valve-driven case and a valve-rested case. In a valve-driven case, air is sucked in an intake process, but in a valve-rested case, air is not sucked. Further, in a valve-rested case, when piston motion is performed with a valve being closed, air taken in at the start of resting goes out through a portion other than the valve, so that the pressure in the combustion chamber decreases.

Since flow due to compression or expansion is great under a high-pressure environment, in a valve-driven case, discharge maintaining voltage increases and a discharge duration shortens, as in an intake/exhaust process.

In addition, as is known in Paschen's law, insulation breakdown voltage of an ignition plug depends on pressure, and increases as the pressure increases. Particularly, in the vicinity of the compression top dead center (±0degATDC), as described above, the pressure is higher in a valve-driven case than in a valve-rested case.

On the other hand, in the vicinity of the exhaust top dead center (±360degATDC), since a valve is closed in a valve-rested case though a valve is often opened in a valve-driven case, the pressure in a combustion chamber in a valve-rested case is often higher.

From the above, the intake/exhaust valve state can be determined by detection of an ignition discharge duration, ignition discharge maintaining voltage, or insulation breakdown voltage.

Hereinafter, a control device for an internal combustion engine according to the first embodiment of the present invention will be described based on the drawings.

Figure 1:
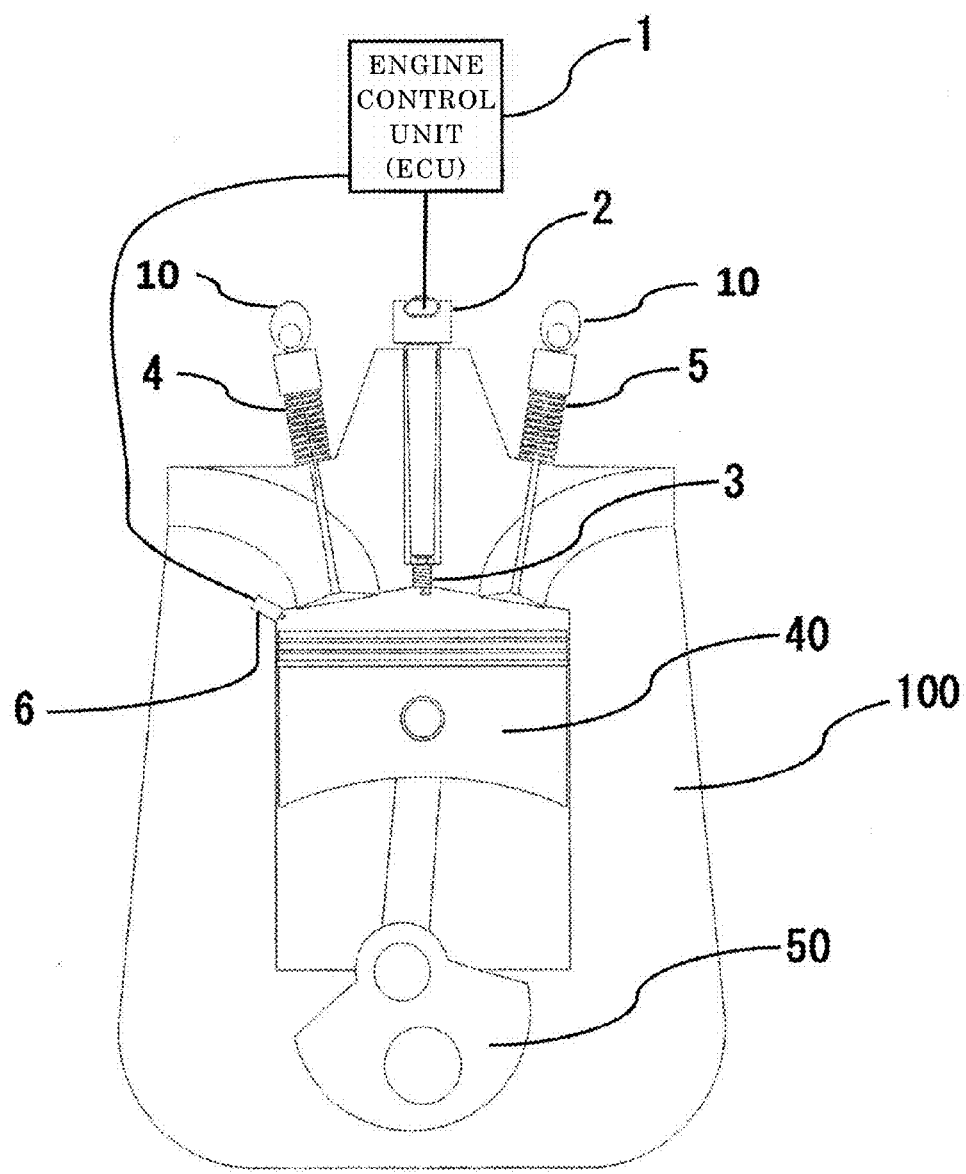
FIG. 1 is a diagram showing the schematic structure of an internal combustion engine according to the first embodiment of the present invention.
Figure 2:
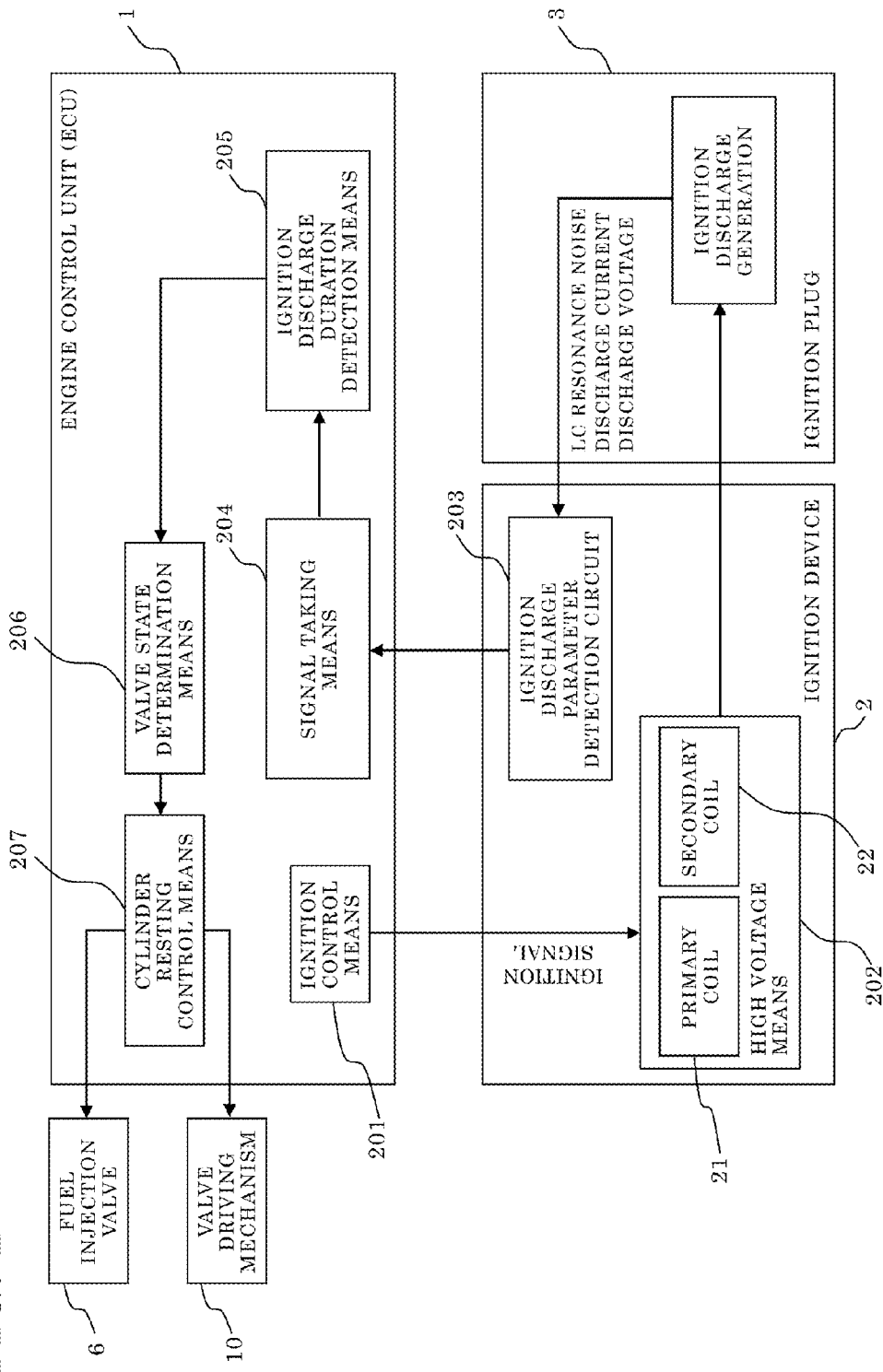
FIG. 2 is a block diagram showing the configuration of a control device for the internal combustion engine according to the first embodiment of the present invention.

In FIGS. 1 and 2, at the top of a cylinder 100 of the internal combustion engine, an ignition plug 3 connected to an ignition device (ignition means) 2 is provided, and inside the cylinder 100, a piston 40 connected to a crank shaft 50 is contained. In addition, a fuel injection valve 6 for injecting fuel into the cylinder 100 is provided. The fuel injection valve 6 stops fuel injection, based on a cylinder resting instruction described later.

In addition, the cylinder 100 of the internal combustion engine is provided with an intake valve 4 and an exhaust valve 5, and a valve driving mechanism 10 for driving each valve. The valve driving mechanism 10 can fix the intake valve 4 and the exhaust valve 5 into a closed state, based on a cylinder resting instruction.

The ignition plug 3 has a first electrode as a central electrode to which ignition voltage for causing spark discharge is applied, and a second electrode opposed to the first electrode via a gap and maintained at a ground potential. By the ignition voltage being applied between these electrodes, spark discharge is generated to ignite or fire (hereinafter, simply referred to as "ignite") a combustible air-fuel mixture in the combustion chamber, thereby combusting the combustible air-fuel mixture. In the present invention, when fuel injection is stopped based on a cylinder resting instruction, combustion does not occur but only spark discharge is generated.

Figure 3:
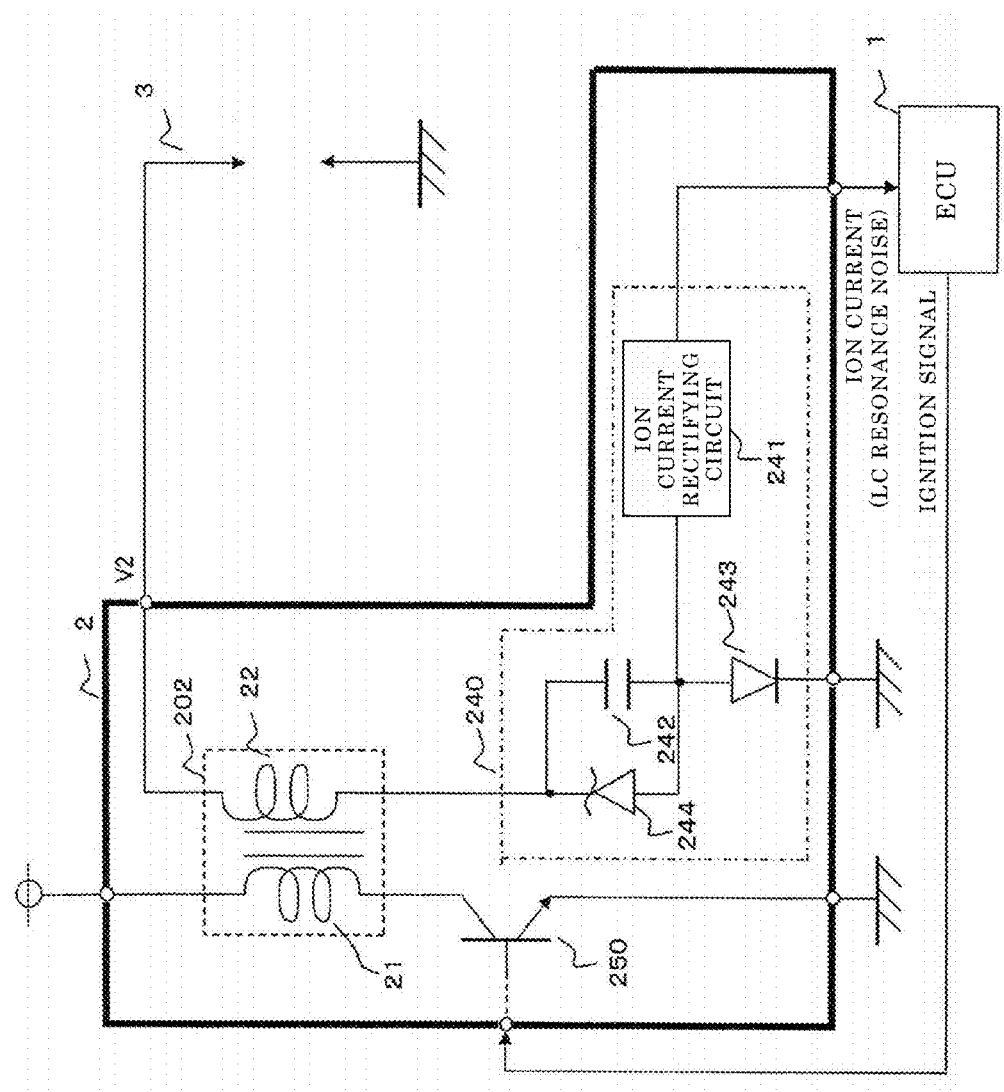
FIG. 3 is a circuit configuration diagram showing an example of an ignition device according to the first embodiment of the present invention.

The ignition device 2 is fixed being mechanically integrated with the ignition plug 3, and has a primary coil 21 connected to a power supply composed of a battery, a secondary coil 22 coupled with the primary coil 21 via a magnetic iron core, and an ignition discharge parameter detection circuit 203. In the present embodiment, as shown in FIG. 3, an ion current detection circuit 240 is provided as an example of the ignition discharge parameter detection circuit 203. The primary coil 21 and the secondary coil 22 compose high voltage means 202 in the ignition device 2.

The ion current detection circuit 240 provided in the ignition device 2 includes a bias circuit connected to the low voltage side of the secondary coil 22 of the ignition device 2, that is, a capacitor 242, a diode 243 interposed between the capacitor 242 and the ground, and a zener diode 244 for voltage limitation, connected in parallel to the capacitor 242. The capacitor 242 and the zener diode 244 connected in parallel to the capacitor 242 are interposed between the low voltage side of the secondary coil 22 and the ground, to form a charging path for charging the capacitor 242 with bias voltage when ignition discharge current is generated. The bias voltage functions as a power supply for ion current detection, and an ion current rectifying circuit 241 performs multiplication processing or the like for the detected current.

An engine control unit (hereinafter, referred to as an ECU) 1 acquires output of the ignition discharge parameter detection circuit 203 (here, output of the ion current rectifying circuit 241) by signal taking means 204. The signal taking means 204 converts a current signal to a voltage signal and converts, via an AD converter, the voltage signal into a signal to be processed by a microcomputer. As will be described in detail, since output of the ignition discharge parameter detection circuit 203 is a high-frequency signal, it is desirable to set the AD conversion sampling rate to be fast (about several to several ten μs).

The ECU 1 processes the signal acquired by the signal taking means 204, using ignition discharge duration detection means 205, to acquire an ignition discharge duration.

In addition, the ECU 1 generates a cylinder resting instruction to stop fuel injection of the fuel injection valve 6 and stop the intake valve 4 and the exhaust valve 5 by cylinder resting control means 207, in accordance with an operation condition. On the other hand, the ECU 1 generates a valve driving recovery instruction to return the intake valve 4 and the exhaust valve 5 from a stopped state to a driven state.

Further, the ECU 1 can determine a valve operation state by valve state determination means 206, based on the acquired ignition discharge duration, the cylinder resting instruction, and the valve driving recovery instruction.

Figure 4:
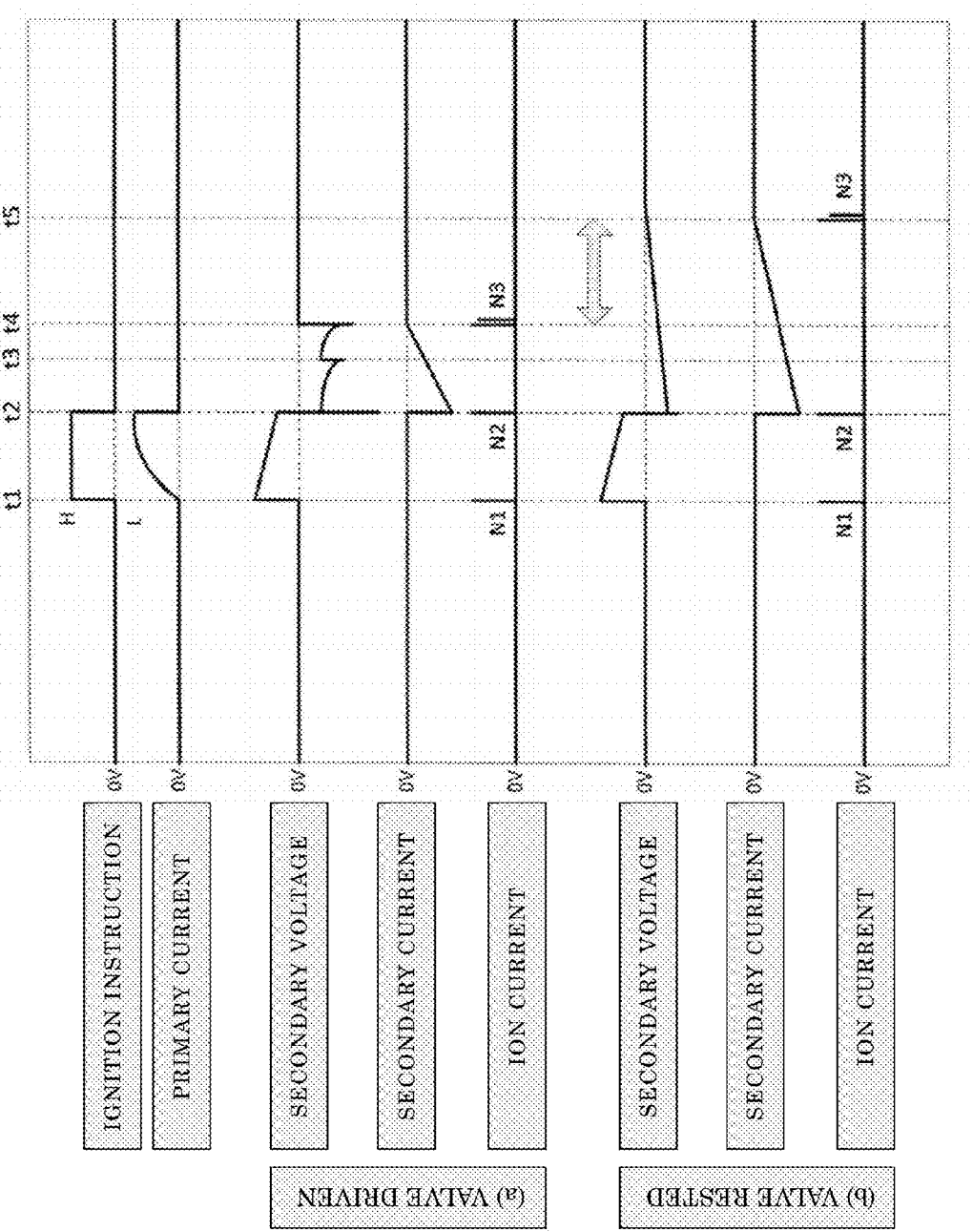
FIG. 4 is a timing chart for explaining operations in a valve-driven case and a valve-rested case of the internal combustion engine according to the first embodiment of the present invention.

Next, a specific operation of the control device for the internal combustion engine according to the first embodiment of the present invention, particularly, a valve state determination device will be described. FIG. 4 is a timing chart for explaining the operation of the valve state determination device of the internal combustion engine according to the first embodiment of the present invention, in which the horizontal axis indicates time (which may be a crank angle, instead).

First, ignition control means 201 in the ECU 1 generates an ignition signal at least once per one ignition plug 3 during one intake process or one exhaust process, based on an intake valve driving timing or an exhaust valve driving timing (time t1). When the ignition signal becomes a high level (hereinafter, referred to as H level), primary current flows in the primary coil 21 in the ignition device 2, whereby the ignition device 2 starts to accumulate energy. Then, at an ignition timing (time t2) when the ignition signal switches from H level to a low level (hereinafter, referred to as L level), high voltage is generated in the secondary coil 22. Here, at the ignition timing, the intake valve and the exhaust valve are in an opened state. The high voltage (secondary voltage) generated in the secondary coil 22 is transferred to the first electrode of the ignition plug 3, insulation breakdown occurs between the first electrode and the second electrode, ignition discharge current starts to flow, and the ignition discharge is sustained during a period corresponding to the accumulated energy. In addition, at the timings of t1 and t2, noises N1 and N2 flow in the ion current detection circuit 240. Therefore, it is desirable to mask noise at these timings.

As described above, in a valve-driven case, ignition discharge between the ignition plug electrodes is drifted by flow due to intake or exhaust when a valve is opened, whereby an ignition discharge path is elongated. Therefore, as shown in time t2 to t3, the secondary voltage (discharge maintaining voltage) increases in a negative direction. If the ignition discharge path is elongated too much, the discharge may be interrupted. Meanwhile, as shown in time t3 to t4, the ignition discharge path may be elongated again and the secondary voltage (discharge maintaining voltage) may increase in a negative direction.

At time t4, when the accumulated energy decreases and the ignition discharge current becomes smaller than a level that allows the ignition discharge to be maintained, the ignition discharge is ended. Then, occurrence of insulation breakdown is attempted again by using residual energy but is failed, and LC resonance noise N3 (capacitance current) occurs due to inductance of the secondary coil 22 of the ignition device 2, floating capacitance on the secondary coil side, and the capacitor 242. Since the LC resonance noise N3 flows in the ion current detection circuit 240, only current in the positive direction is detected as current at the end of discharge. The occurrence width of the LC resonance noise N3 is about several ten to several hundred μs. A period from the ignition timing (time t2) to the timing (time t4) when the LC resonance noise N3 is detected is an ignition discharge duration.

On the other hand, in a valve-rested case, a valve is always closed and there is almost no influence of flow due to intake or exhaust performed when a valve is opened. Therefore, ignition discharge is hardly drifted and an ignition discharge path is not elongated. Therefore, discharge maintaining voltage does not increase in a negative direction, unlike a valve-driven case. Therefore, in a valve-rested case, LC resonance noise N3 is detected at a timing (time t5) which is later than the discharge end timing (time t4) in a valve-driven case. The valve state can be detected based on the difference between time t4 and time t5.

Figure 5:
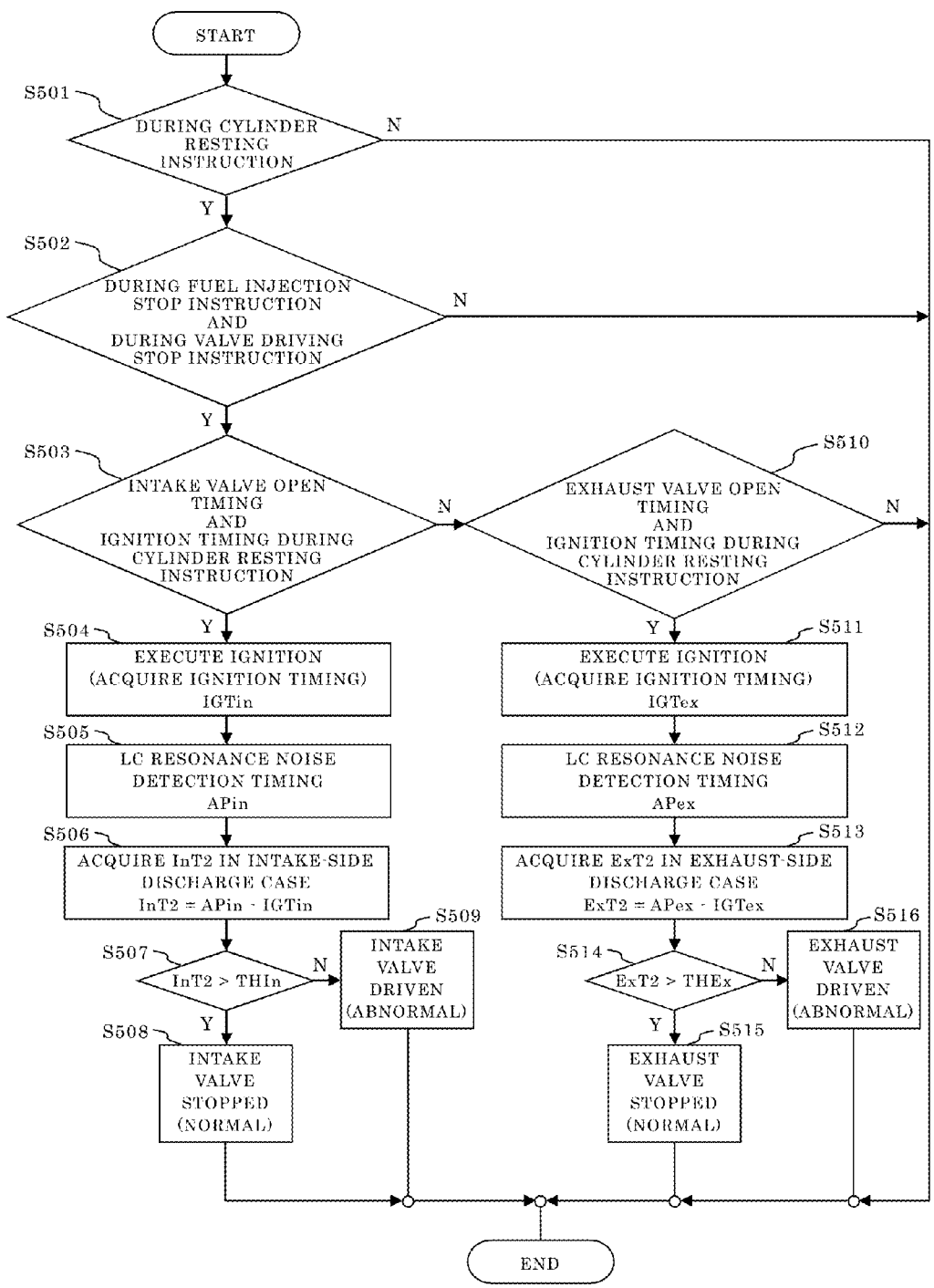
FIG. 5 is a flowchart showing an operation of the control device for the internal combustion engine according to the first embodiment of the present invention.

Next, a specific process by the valve state determination device (a process by the ECU 1) will be described. FIG. 5 is a flowchart showing the operation of the valve state determination device of the internal combustion engine according to the first embodiment of the present invention. The process is repeated at predetermined time intervals.

In FIG. 5, first, in step S501, whether or not a cylinder resting instruction is being issued is determined.

If it is determined that a cylinder resting instruction is being issued (Y), the process proceeds to step S502. In step S502, whether or not an instruction to stop both fuel injection and valve driving is being issued is determined. If it is determined that the instruction to stop both is being issued (Y), the process proceeds to step S503.

In step S503, whether or not the crank angle at the present time is an intake valve open timing is determined. Even during the cylinder resting instruction being issued, this timing can be acquired from information set in another combustion cylinder (a cylinder that is not rested). Further, from the above-described experiment data (FIG. 8), a crank angle where there is a great difference between a valve-driven case and a valve-rested case is specified in advance, and is set as an intake-side ignition timing IGTin during the cylinder resting instruction, and whether or not the crank angle at the present time is IGTin is also determined. The ignition timing in a cylinder-rested case may be set to ¼ or ½ of the valve open/close timing. If it is determined that these conditions are satisfied (Y), the process proceeds to S504.

In step S504, at the intake-side ignition timing IGTin (time t2 in FIG. 4) during the cylinder resting instruction, an ignition instruction is issued to switch an ignition signal outputted from the ignition control means 201, to L level. As described above, the ignition signal keeps H level during a set period until the ignition timing, whereby the ignition device 2 accumulates energy, and then, when the ignition signal is switched to L level, ignition discharge is generated at the ignition plug 3.

Then, when the accumulated energy decreases and the ignition discharge is ended, LC resonance noise N3 is detected as current at the end of discharge, by the ion current detection circuit 240 (ignition discharge parameter detection circuit 203). As described above, the ECU 1 acquires this signal by the signal taking means 204. In step S505, an LC resonance noise occurrence timing APin (time t4 or t5 in FIG. 4) is acquired from the acquired signal.

In step S506, an intake-side ignition discharge maintaining period InT2 is calculated from the acquired LC resonance noise occurrence timing APin and the intake-side ignition timing IGTin, by InT2=APin−IGTin. Processing of steps S505 and S506 is performed by the ignition discharge duration detection means 205.

In step S507, whether or not the calculated intake-side ignition discharge maintaining period InT2 is longer than an intake valve state determination threshold value THin is determined. If InT2 is longer than THin (Y), the process proceeds to step S508 to determine that the intake valve is rested, that is, the intake valve state is normal. On the other hand, if, in step S507, InT2 is shorter than THin (N), the process proceeds to step S509 to determine that the intake valve is driven, that is, the intake valve state is abnormal. The valve state determination threshold value THin may be set as a map value for each operation condition (for example, rotation rate or load). Processing of steps S507 to S509 is performed by the valve state determination means 206.

The description thus far is for determination of the intake valve state. Hereinafter, determination of the exhaust valve state will be described. As a result of the above determination in step S503, if the crank angle at the present is not the intake valve open timing (N), the process proceeds to step S510 to determine whether or not the crank angle at the present is an exhaust valve open timing. Further, as in the case of intake side, an exhaust-side ignition timing IGTex during the cylinder resting instruction is set, and whether or not the crank angle at the present is IGTex is determined. If it is determined that these conditions are satisfied (Y), the process proceeds to S511.

Processing of steps S511 to S516 is also basically the same as in the case of intake side, so the description will be briefly given. In step S511, ignition discharge is generated at the exhaust-side ignition timing IGTex during the cylinder resting instruction, in step S512, an LC resonance noise occurrence timing APex is acquired at the end of discharge, and then in step S513, an exhaust-side ignition discharge maintaining period ExT2 (=APex−IGTex) is acquired from APex and IGTex.

In step S514, whether or not the calculated exhaust-side ignition discharge maintaining period ExT2 is longer than an exhaust valve state determination threshold value THex. If ExT2 is longer than THex (Y), the process proceeds to step S515 to determine that the exhaust valve is rested, that is, the exhaust valve state is normal. On the other hand, if, in step S514, ExT2 is shorter than THex (N), the process proceeds to step S516 to determine that the exhaust valve is driven, that is, the exhaust valve state is abnormal.

On the other hand, in the case of recovering from a cylinder-rested state, though not described in detail because the process is basically similar, whether or not a valve is normally shifted from a stopped state to a driven state is detected. That is, when it is determined that a cylinder resting cancelling instruction is being issued, the same processing as in steps S502 to S516 described above is performed to determine whether the valve state is normal or abnormal. Determination results (normal and abnormal) in steps S508 and S509 and steps S515 and S516 are reversed.

If fuel is injected and combusted when the valve state is abnormal, backfire or engine failure can occur. Therefore, based on the determination result, the cylinder resting control means 207 may continuously instruct the fuel injection valve 6 to stop fuel injection, and light an alert lamp indicating engine abnormality, to give a notification of the abnormality.

The control device for an internal combustion engine according to the first embodiment of the present invention as described above makes it possible to accurately detect abnormality of an intake/exhaust valve operation state of an internal combustion engine having a cylinder resting mechanism. Abnormality of an intake/exhaust valve operation state can be detected based on the relationship between an instruction by the cylinder resting control means and an intake/exhaust ignition discharge duration. In the case where the valve operation state of one valve is normal but the valve operation state of the other valve is abnormal, the conventional device shown in Patent Document 1 or Patent Document 2 cannot detect the valve operation state when the one valve is closed, and thus the detection accuracy is low. However, the control device for an internal combustion engine according to the first embodiment of the present invention can accurately detect the valve operation state, regardless of whether the one valve is opened or closed.

In addition, in the control device for an internal combustion engine according to the first embodiment of the present invention, since ignition for detecting an ignition discharge duration is performed based on an intake valve driving timing or an exhaust valve driving timing, the ignition discharge duration can be detected at a timing when flow becomes large due to intake or exhaust when a valve is opened, whereby the detection accuracy is improved. In addition, it is possible to meet the intake/exhaust valve driving timing which changes depending on each operation condition.

In addition, since the control device for an internal combustion engine according to the first embodiment of the present invention has the ion current detection circuit 240, it becomes possible to not only detect an ignition discharge duration but also, in the case other than a cylinder resting instruction period, detect ion current occurring along with combustion, thereby detecting the combustion state.

In addition, in the control device for an internal combustion engine according to the first embodiment of the present invention, since ignition for detecting an ignition discharge duration is performed based on an intake valve driving timing or an exhaust valve driving timing, the ignition discharge duration can be detected at a timing when flow becomes large due to intake or exhaust when a valve is opened, whereby the determination accuracy is improved. In addition, it is possible to meet the valve driving timing which changes depending on each operation condition.

Second Embodiment

Figure 6:
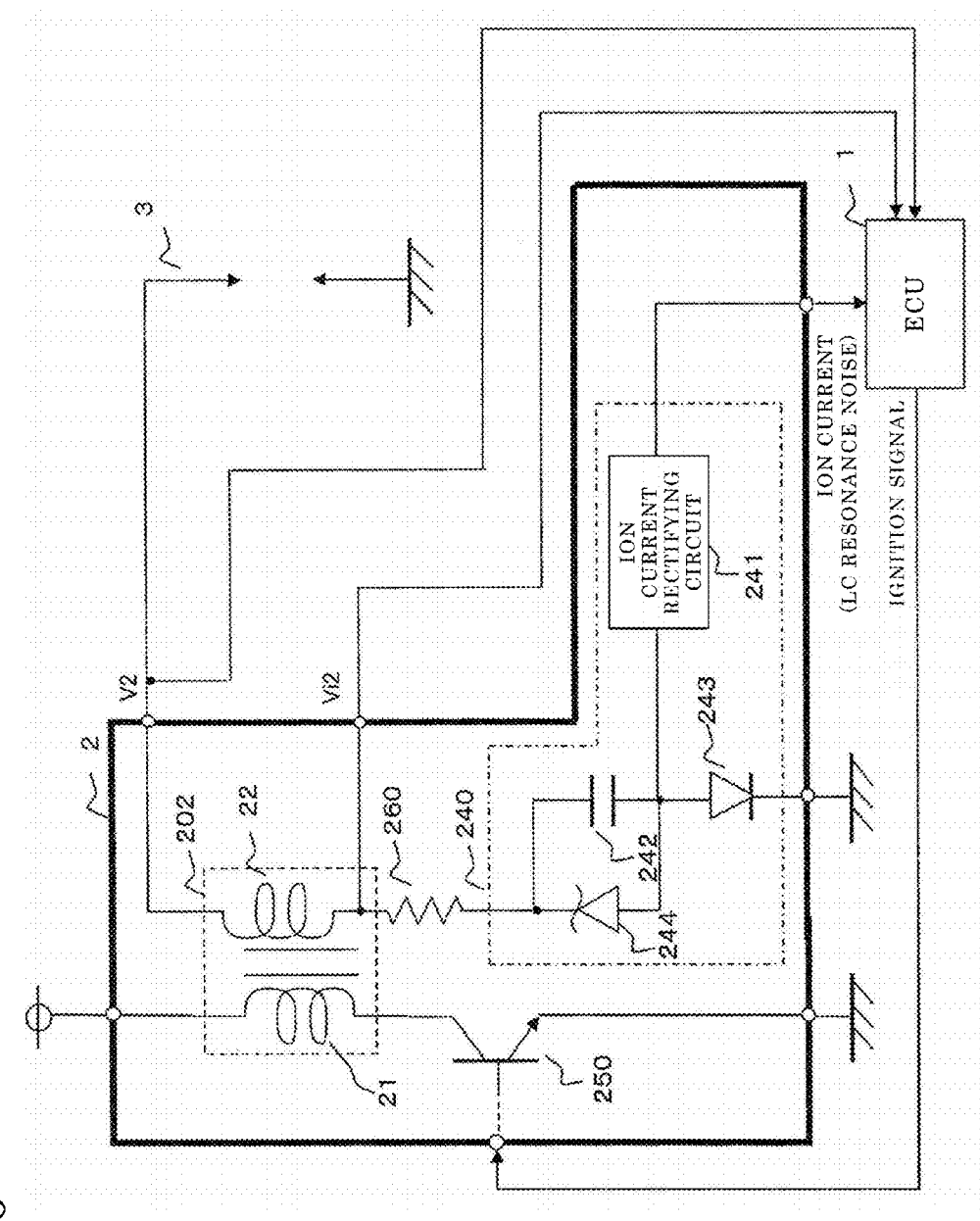
FIG. 6 is a circuit configuration diagram showing an example of an ignition device according to the second embodiment of the present invention.

In the first embodiment described above, as shown in FIG. 3, the ion current detection circuit 240 is provided as an example of the ignition discharge parameter detection circuit 203, to detect an ignition discharge duration. Instead, as shown in FIG. 6, ignition discharge current (secondary current) obtained as voltage Vi2 via a resistor 260 provided between the secondary coil 22 and the ion current detection circuit 240 may be inputted to the ECU 1, to detect an ignition discharge duration. As shown in FIG. 4, an ignition discharge duration can also be detected by detecting a time during which ignition discharge current (secondary current) is flowing.

As shown in FIG. 6, secondary voltage V2 between the secondary coil 22 and the ignition plug 3 may be inputted to the ECU 1, to detect an ignition discharge duration. As shown FIG. 4, an ignition discharge duration can also be detected by detecting a time during which ignition discharge maintaining voltage (secondary voltage) is generated.

The control device for an internal combustion engine according to the second embodiment of the present invention as described above can provide the same effect as in the first embodiment even in the case where the AD conversion sampling rate of the ECU 1 cannot be set to about several to several ten μs. In addition, since the same effect as in the first embodiment can be obtained regardless of whether or not the ion current detection circuit 240 is provided, in the case where combustion state detection using ion current occurring along with combustion is not performed, the ion current detection circuit 240 may be removed, whereby the size and the cost of the ignition device 2 can be reduced.

Third Embodiment

In the first embodiment described above, abnormality of the intake/exhaust valve operation state is detected based on the relationship between an instruction by the cylinder resting control means and an intake/exhaust ignition discharge duration. In the third embodiment, abnormality of the intake/exhaust valve operation state is detected, further using ignition insulation breakdown voltage.

As shown in FIG. 8 described above, there is a difference in pressure in the combustion chamber between a valve-driven case and a valve-rested case. In the vicinity of the compression top dead center (±0degATDC), the pressure is often higher in a valve-driven case than in a valve-rested case, and in the vicinity of the exhaust top dead center (±360degATDC), the pressure in the combustion chamber is often higher in a valve-rested case.

Accordingly, in addition to an ignition discharge duration detected by ignition at an intake/exhaust valve open timing in the first embodiment, ignition insulation breakdown voltage (secondary voltage at time t2 in FIG. 4) correlated with the pressure according to Paschen's law described above may be detected based on the secondary voltage V2 in FIG. 6, and may be used.

In the case where, in addition to ignition at an intake/exhaust valve open timing, ignition is performed in the vicinity of the compression top dead center (±0degATDC), the absolute value of secondary voltage V2 is higher in a valve-driven case. Therefore, if the absolute value of secondary voltage V2 is greater than a predetermined threshold value, a valve can be determined to be in a driven state, and if the absolute value is smaller, a valve can be determined to be in a rested state.

On the other hand, in the case where ignition is performed in the vicinity of the exhaust top dead center (±360degATDC), the absolute value of secondary voltage V2 is smaller in a valve-driven case. Therefore, if the absolute value of secondary voltage V2 is greater than a predetermined threshold value, a valve can be determined to be in a driven state, and if the absolute value is smaller, a valve can be determined to be in a rested state.

In addition, not only ignition insulation breakdown voltage but also ignition discharge maintaining voltage (secondary voltage after time t2 in FIG. 4) may be detected based on secondary voltage V2 in FIG. 6 and may be used. In a valve-driven case, as shown in time t2 to t3, ignition discharge between the ignition plug electrodes is drifted by flow due to intake or exhaust when a valve is opened, whereby an ignition discharge path is elongated, and secondary voltage (discharge maintaining voltage) increases. On the other hand, in a valve-rested case, since a valve is always closed and there is almost no influence of flow due to intake or exhaust performed when a valve is opened, ignition discharge is hardly drifted and an ignition discharge path is not elongated. Therefore, discharge maintaining voltage is smaller than in a valve-driven case, and often decreases monotonously.

Accordingly, by detecting the greatest value of the absolute value of discharge maintaining voltage after time t2, if the value is greater than a predetermined value, a valve can be determined to be a driven state, and if the value is smaller, a valve can be determined to be a rested state. Alternatively, the change amount of the discharge maintaining voltage during a predetermined period after time t2 may be detected, whereby if the value is greater than a predetermined value, a valve may be determined to be a driven state, and if the value is smaller, a valve may be determined to be a rested state.

In the control device for an internal combustion engine according to the third embodiment of the present invention as described above, in the condition that there is small influence of flow, such as light-load operation in which a throttle opening degree is small, it may be desirable to perform detection using a difference in ignition insulation breakdown voltage which depends on the pressure, rather than using an ignition discharge duration. However, since an intake/exhaust valve operation state is detected from a plurality of ignition discharge parameters including not only an ignition discharge duration correlated with flow but also ignition insulation breakdown voltage correlated with pressure, the detection accuracy is improved.

Fourth Embodiment

Figure 7:
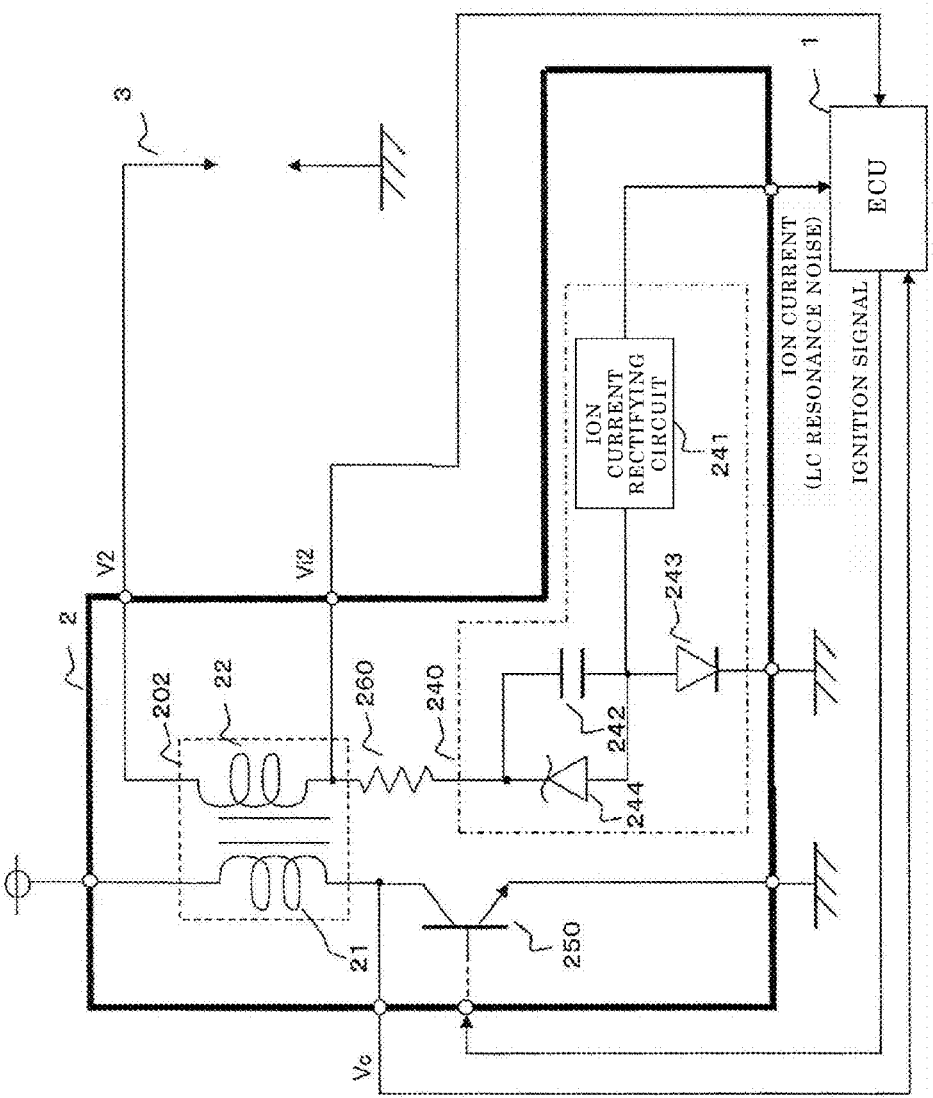
FIG. 7 is a circuit configuration diagram showing an example of an ignition device according to the fourth embodiment of the present invention.

In the second embodiment or the third embodiment described above, as shown in FIG. 6, secondary voltage V2 between the secondary coil 22 and the ignition plug 3 is inputted to the ECU 1, to detect ignition insulation breakdown voltage or ignition discharge maintaining voltage. Instead, as shown in FIG. 7, collector voltage Vc of a transistor 250 may be used. Although positive and negative polarities are reversed, the behavior thereof is the same as that of secondary voltage V2. Therefore, the same effect as in the second or third embodiment can be obtained.

In the control device for an internal combustion engine according to the fourth embodiment of the present invention as described above, since discharge voltage such as ignition discharge maintaining voltage or ignition insulation breakdown voltage is detected using primary voltage (collector voltage Vc) on the primary coil 21 side, voltage lower than voltage on the secondary coil side where high voltage of several to several ten kV is generated can be outputted. Therefore, handling is facilitated in the sense of circuit configuration and the same behavior as in embodiment 2 or 3 can be obtained.

It is noted that, within the scope of the present invention, the above embodiments may be freely combined with each other, or each of the above embodiments may be modified or abbreviated as appropriate.

INDUSTRIAL APPLICABILITY

The present invention is applicable to an automobile, a two-wheel vehicle, an outboard engine, and the like that use an internal combustion engine having a cylinder resting mechanism, to realize efficient operation of the internal combustion engine, thus serving to solve problems of fuel depletion and environmental conservation.

Various modifications and alterations of this invention will be apparent to those skilled in the art without departing from the scope and spirit of this invention, and it should be understood that this is not limited to the illustrative embodiments set forth herein.

What is claimed is:

1. A control device for an internal combustion engine having a cylinder resting mechanism, comprising:
    cylinder resting control means for giving an instruction to stop valve driving of opening or closing an intake/exhaust valve of an internal combustion engine and stop fuel injection to a cylinder of the internal combustion engine;
    ignition control means for generating an ignition signal both in a valve-driven case and in a valve-rested case of the internal combustion engine;
    ignition means including high voltage means for causing ignition discharge on an ignition plug provided in a combustion chamber of the internal combustion engine, based on the ignition signal, and an ignition discharge parameter detection circuit for detecting a parameter indicating a state of the ignition discharge; and
    valve state determination means for determining an operation state of the intake/exhaust valve, based on at least one of an ignition discharge duration, ignition insulation breakdown voltage, and ignition discharge maintaining voltage which are detected based on an output signal from the ignition discharge parameter detection circuit, wherein
    the cylinder resting control means is operated based on a result of determination by the valve state determination means.

2. The control device for an internal combustion engine having a cylinder resting mechanism according to claim 1, wherein
    the valve state determination means includes ignition discharge duration detection means for detecting the ignition discharge duration, based on an output signal from the ignition discharge parameter detection circuit, and determines a valve operation state of the intake/exhaust valve, based on the detected ignition discharge duration.

3. The control device for an internal combustion engine having a cylinder resting mechanism according to claim 2, wherein
    the ignition discharge parameter detection circuit detects ignition discharge current or ignition discharge maintaining voltage of the ignition means.

4. The control device for an internal combustion engine having a cylinder resting mechanism according to claim 2, wherein
the valve state determination means detects the ignition insulation breakdown voltage or the ignition discharge maintaining voltage, based on an output signal from the ignition discharge parameter detection circuit, and determines a valve operation state of the intake/exhaust valve, based on the detected ignition insulation breakdown voltage or the detected ignition discharge maintaining voltage.

5. The control device for an internal combustion engine having a cylinder resting mechanism according to claim 1, wherein
the ignition control means generates the ignition signal at least once per one ignition plug during one intake process or one exhaust process, based on an intake valve driving timing or an exhaust valve driving timing.

6. The control device for an internal combustion engine having a cylinder resting mechanism according claim 1, wherein
the high voltage means includes a primary coil for generating and accumulating a magnetic flux by current being flowed therein, and a secondary coil which is magnetically coupled with the primary coil and generates predetermined high voltage by the accumulated energy being released, thereby obtaining ignition discharge voltage from primary voltage of the primary coil.

* * * * *